United States Patent
Sato (10) Patent No.: US 10,712,539 B2
(45) Date of Patent: Jul. 14, 2020

(54) CAMERA LENS

(71) Applicant: AAC Acoustic Technologies (Shenzhen) Co., Ltd., Shenzhen (CN)

(72) Inventor: Setsu Sato, Shenzhen (CN)

(73) Assignee: AAC Communcation Technologies (Changzhou) Co., Ltd., Changzhou (CN)

( * ) Notice: Subject to any disclaimer, the term of this patent is extended or adjusted under 35 U.S.C. 154(b) by 106 days.

(21) Appl. No.: 16/101,614

(22) Filed: Aug. 13, 2018

(65) Prior Publication Data

US 2019/0121091 A1  Apr. 25, 2019

(30) Foreign Application Priority Data

Oct. 19, 2017  (JP) ................. 2017-202680

(51) Int. Cl.
| | |
|---|---|
| *G02B 3/02* | (2006.01) |
| *G02B 13/18* | (2006.01) |
| *G02B 13/00* | (2006.01) |
| *G02B 27/00* | (2006.01) |
| *G02B 9/60* | (2006.01) |
| *G02B 3/00* | (2006.01) |

(52) U.S. Cl.
CPC ....... *G02B 13/0045* (2013.01); *G02B 3/0087* (2013.01); *G02B 9/60* (2013.01); *G02B 27/0025* (2013.01)

(58) Field of Classification Search
CPC ............ G02B 13/0045; G02B 13/0015; G02B 13/16; G02B 13/18; G02B 13/143; G02B 13/04; G02B 13/22; G02B 9/60; G02B 3/04; G02B 27/0025; G02B 17/0892

USPC ........ 359/641, 648–650, 672–706, 708, 716, 359/745, 748, 749, 754, 784
See application file for complete search history.

(56) References Cited

U.S. PATENT DOCUMENTS

| | | | | |
|---|---|---|---|---|
| 7,710,665 | B2* | 5/2010 | Park | G02B 9/34 359/714 |
| 7,864,456 | B2* | 1/2011 | Ishibashi | G02B 27/0062 359/683 |
| 8,189,269 | B2* | 5/2012 | Matsuo | G02B 15/173 359/676 |
| 9,423,593 | B2* | 8/2016 | Jung | G02B 13/0045 |
| 9,784,946 | B2* | 10/2017 | Jo | G02B 13/0045 |
| 10,073,245 | B2* | 9/2018 | Park | G02B 13/0045 |
| 10,481,365 | B2* | 11/2019 | Park | G02B 13/0045 |

* cited by examiner

*Primary Examiner* — William R Alexander
*Assistant Examiner* — Tamara Y. Washington
(74) *Attorney, Agent, or Firm* — IPro, PLLC; Na Xu (57) ABSTRACT

The present invention provides a camera lens including: a first lens having a negative refractive power with a convex object side surface, a second lens having a positive refractive power with a convex object side surface, a third lens having negative refractive power with a concave image side surface, a fourth lens having a positive refractive power with a concave object side surface, and a fifth lens having a negative refractive power with a convex object side surface and a concave image side surface. The object side surface of the first lens, an object side surface and the image side surface of the third lens, the object side surface and an image side surface of the fourth lens, the object side surface and the image side surface of the fifth lens are aspherical surfaces. Specific conditions are satisfied.

7 Claims, 11 Drawing Sheets

CAMERA LENS

FIELD OF THE PRESENT DISCLOSURE

The present invention relates to a camera lens, it comprises five lenses with excellent optical properties, which are small in size, have a long back focal length, an angle of view of above 80° and a bright F value of below 2.40. It can be used as a camera lens of small cameras, such as camera lens for mobile and camera lens for mobile device, camera lens for a robot, a vehicle lens, an industrial camera lens, etc.

DESCRIPTION OF RELATED ART

In recent years, various kinds of camera devices using camera components such as CCD and CMOS, have become widely popular. With the miniaturization and high performance development of camera components, the society needs small camera lenses with excellent optical properties more.

The technological development related to a camera lens consisting of five small lenses with excellent optical properties moves forward step by step. The proposed solution is that the camera lens consists of five lenses, which are arranged successively from the object side, a first lens with negative refractive power, a second lens with positive refractive power, a third lens with negative refractive power, a fourth lens with positive refractive power, and a fifth lens with negative refractive power.

The camera lens of the related technology consists of the above five lenses. Although an aperture is arranged between the first lens and the second lens, the gap between the first lens and the second lens will become narrower because of the requirement of ultra-thin and long back focal length of lens, therefore it is difficult to ensure the space for putting the aperture. Furthermore, the edge of the first lens cannot be aligned directly with the edge of the second lens, because the aperture component material needs to be put in, so there is a tolerance problem.

Moreover, the concave convex lens facing the concave surface of the image side surface near the axis of the third lens with broad Fno light is weaker, so the coma aberration becomes larger, hence there is the problem that the resolution near on-axis decreases when it becomes brighter than F2.4.

The camera lens of the related technology consists of the above mentioned five lenses. Although the above problem is solved by setting a aperture between the second lens and the third lens, but on the image side, as the third lens of convex shape is subject to coma aberration near on-axis, when the F value is set to be a bright value below 2.4, the resolution near on-axis decreases. Moreover, although the third lens has an Abbe of above 0, it is difficult to eliminate chromatic aberration on-axis, when the F value is set to be a bright value of below 2.4, the resolution near on-axis decreases and the recent requirements of high-pixel can not be met.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
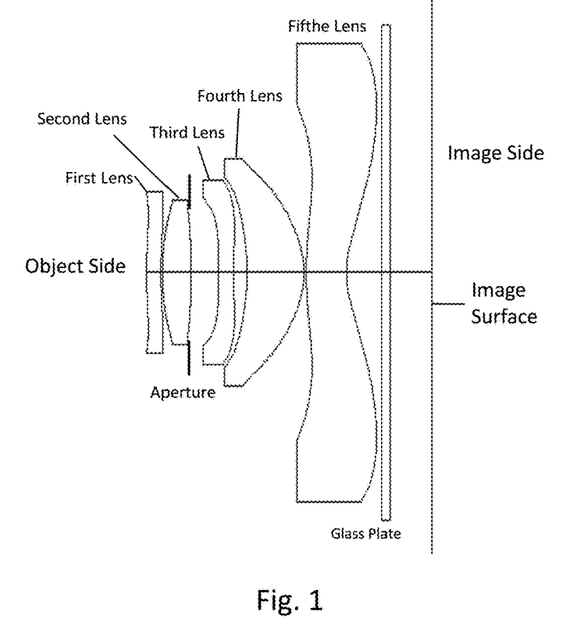
FIG. 1 is an illustrative structural view of a camera lens LA related to the present invention.
Figure 2:
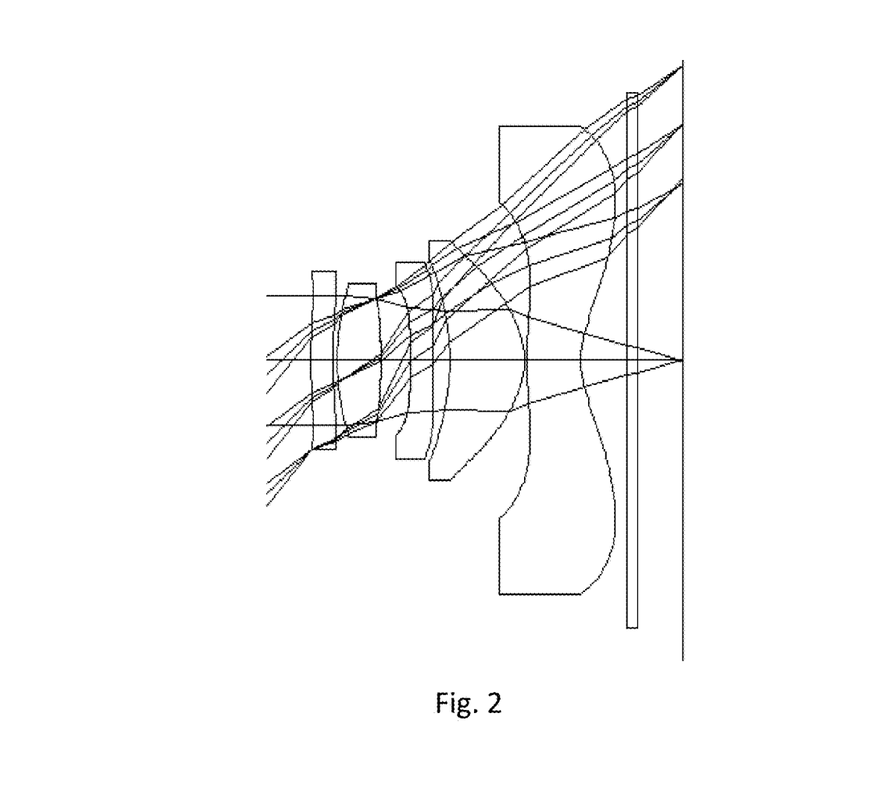
FIG. 2 is light path chart of the camera lens.

An embodiment of the camera lens associated with the present invention is illustrated with the figures. FIG. 1 shows a composition diagram of a camera lens associated with one embodiment of the invention. The camera lens LA consists of following five lens group which are arranged successively from object side to image side: a first lens, a second lens, an aperture, a third lens, a fourth lens and a fifth lens. A protective glass is provided between the fifth lens and the camera surface. The protective glass may be more than 1 piece, and it is also possible not to set it.

In the invention, the camera lens consists of five lenses, which have in turn negative, positive, negative, positive and negative refractive powers from the object side to the image side, as a result, a lens with a short system total length and a long lens back back focal length can be obtained.

By arranging the aperture between the second lens and the third lens, a normal lens frame design can be obtained in processing and tolerance, which can eventually improve mass production rate of finished products and mass production rate.

The object side surface of the first lens has a convex surface toward the object side near the axis, the object side surface of the second lens has a convex surface toward the object side near the axis, the image side surface of the third lens has a concave surface toward the image side near the axis, the object side surface of the fourth lens has a concave surface toward the object side near the axis, the image side surface of the fourth lens has a convex surface toward the image side near the axis, the object side surface of the fifth lens has a convex surface toward the object side near the axis, the image side surface of the fifth lens has a concave surface toward the image side near the axis. At least, the object side surface of the first lens, the object side surface of the third lens, the image side surface of the third lens, the object side surface of the fourth lens, the image side surface of the fourth lens, the object side surface of the fifth lens, the image side surface of the fifth lens have aspherical surfaces designed as Fno bright wide angle of field, which can improve resolution.

The camera lens LA is a camera lens which satisfies the following conditions (1) to (4):

$$-550 \le f1/f2 \le -2.5 \quad (1)$$

$$0.1 \le T23/f \le 0.2 \quad (2)$$

$$-86.3 \le R31/f3 \le 6.3 \quad (3)$$

$$-2.0 \le R32/f3 \le -0.3 \quad (4)$$

where
f1: focal length of the first lens;
f2: focal length of the second lens;
f3: focal length of the third lens;
f: focal length of the total camera lens;
T23: Air spacing on the optical axis between the second lens and the third lens;
R31: Curvature on the object side surface of the third lens;
R32: Curvature on the image side surface of the third lens.

Condition 1 is a Condition for the lens back focal length and the optical full length. When the upper limit of the Condition is exceeded, the negative refractive power of the first lens becomes stronger, the optical full length becomes longer, and the specification is not suitable. When the lower limit of the Condition is exceeded, the negative refractive power of the first lens becomes weaker, the lens back focal length becomes shorter, and the specification is not suitable.

Condition 2 is the Condition between the aperture space and the resolution on-axis. When the upper limit of the Condition is exceeded, the Fno light beam incident to the third lens will become thinner, the longitudinal aberration or chromatic aberration becomes insufficient in correction, the longitudinal aberration and the chromatic aberration on-axis deteriorates, resulting in decrease of resolution performance on-axis. When the lower limit of the Condition is exceeded, the space of the aperture material will become narrow, and processing and lens frame design will become difficult.

Condition 3 is a Condition for controlling increase in longitudinal aberration and coma aberration caused by Fno brightness and improving the resolution performance of the axis and the middle image height. When the upper limit of the Condition is exceeded, under the circumstance that the peripheral part of the surface and the aperture are not in the same axis, the aberration affecting view angle field including foremost astigmatism, the resolution performance of the peripheral image height will deteriorate. When the lower limit of the Condition is exceeded, the resolution of the axial and the middle image height will deteriorate due to increase in longitudinal aberration and coma aberration.

Condition 4 is a Condition for controlling increase in longitudinal aberration and coma aberration caused by Fno brightness and ensuring the resolution performance of the axis and the middle image height. When the upper limit of the Condition is exceeded, under the circumstance that the peripheral part of the surface and the aperture are not in the same axis, the aberration affecting view angle field including foremost astigmatism, the resolution performance of the peripheral image height will deteriorate. When the lower limit of the Condition is exceeded, the resolution of the axial and the middle image height will deteriorate due to increase in longitudinal aberration and coma aberration.

$$15 \le V1 \le 23.7 \quad (5)$$

$$15 \le V3 \le 23.1 \quad (6)$$

$$V2 > V3 \quad (7)$$

$$34.5 \le V2 - V1 \le 55.3 \quad (8)$$

where
V1: Abbe number of the first lens;
V2: Abbe number of the second lens;
V3: Abbe number of the third lens;

Condition (5) is a Condition for eliminating chromatic aberration on and off axis. Outside the range of the Condition, the improvement of on-axis chromatic aberration and lateral color becomes very difficult, and crocking will occur, and the specification is not suitable.

Condition (6) is a Condition for eliminating chromatic aberration on and off axis. Outside the range of the Condition, the improvement of on-axis chromatic aberration and lateral color becomes very difficult, and crocking will occur, and the specification is not suitable.

Condition (7) is a Condition for eliminating chromatic aberration on and off axis. Outside the range of the Condition, the improvement of on-axis chromatic aberration and lateral color becomes very difficult, and crocking will occur.

Condition (8) is a Condition for eliminating chromatic aberration on and off axis. Outside the range of the Condition, the improvement of on-axis chromatic aberration and lateral color becomes very difficult, and crocking will occur.

$$-86.3 \le R31/f3 \le 0.0 \quad (9)$$

$$35.5 \le V2 - V1 \le 44.2 \quad (10)$$

where
R31: Curvature of the object side surface of the third lens;
f3: The focal length of the third lens.

Condition (9) narrows down the range of Condition (3) and brings a higher resolution. Moreover, a lens with good resolution can be obtained.

Condition (10) narrows down the range of Condition (8) and improves chromatic aberration on and off axis. Moreover, a lens with very little crocking can be obtained.

It is characterized in that, for the image side surface of the third lens of the invention, the part near the optical axis faces the outside, and from the view of the image side, it presents a change from concave to convex. In order to improve on-axis coma aberration, optimally, it should be better the concave surface that faces the image side. But for aberrations, foremost astigmatism, that are affected by the angle of view, optimally, it should be better the convex surface that faces the image side. As to the image side surface of the third lens of the present invention, as the on-axis light beam does not completely coincide with the off-axis light beam, on the aspherical surface, through "from the image side, a change from concave to convex presents", the contradictory elements are rectified.

$$2.0 < |R32-R41|/|R41| < 12.0 \qquad (11)$$

where,

R32: Curvature of the image side surface of the third lens;
R41: Curvature of the object side surface of the fourth lens.

Condition [11] is a Condition for astigmatism, on-axis and intermediate image height coma aberration. When the upper limit of the Condition is exceeded, the astigmatism deteriorates and the on-axis resolution decreases. When the lower limit of the Condition is exceeded, the on-axis and intermediate image height coma aberration deteriorates, and the resolution of the on-axis and intermediate image height decreases.

It is characterized in that, for the image side surface of the fourth lens of the invention, the part near the optical axis faces the outside, and from the view of the image side, it presents a change from convex to concave. For aberrations, foremost astigmatism, that are affected by the angle of view, optimally, it should be better the convex surface that faces the image side, for off-axis coma aberration correction, optimally, it should be the convex surface that faces the image side. As to the image side surface of the fourth lens of the present invention, as the upside light beam does not completely coincide with the chief ray, on the aspherical surface, through "from the image side, a change from convex to concave presents", the contradictory elements are rectified.

$$0.35 < |R42|/f4 < 0.48 \qquad (12)$$

where

R42: Curvature of the image side surface of the fourth lens;
f4: The focal length of the fourth lens.

Condition (12) is a Condition for correcting aberrations, foremost astigmatism, that are affected by the angle of view. By satisfying Condition (12), we can correct aberrations, foremost astigmatism, that are affected by the angle of view, which can improve off-axis resolution performance.

It is characterized in that, for the object side surface of the first lens of the invention, the part near the optical axis faces the outside, and from the view of the image side, it presents a change from convex to concave. For aberrations, foremost astigmatism, that are affected by the angle of view, optimally, it should be better the convex surface that faces the object side, for off-axis coma aberration correction, optimally, it should be better the convex surface that faces the image side. As to the image side surface of the first lens of the present invention, because of the deviation from the lower side light beam, on the aspherical surface, through "from the image side, a change from convex to concave presents", the contradictory elements are rectified.

$$0.6 < f12/f < 1.9 \qquad (13)$$

In which f12: The synthetic focal length of the first lens and the second.

Condition [13] is a Condition for optical full length and resolution performance. When the lower limit of the Condition is exceeded, the optical total length is prolonged and the specification is not suitable. When the upper limit of the conditional Condition is exceeded, the respective refractive power of the lens will become larger and the various aberrations will increase, the resolution performance will decline, the specification is not appropriate.

Below examples are used to illustrate the camera lens of the present invention. The symbols recorded in each example concretely are as follows: the unit of distance, radius and central thickness is mm.

f: The focal length of the whole camera lens;
Fno: F value;
2ω: Field of view angle;
R: Curvature radius of the optical surface, central curvature radius in case of lens.
R1: Curvature radius of the object side surface;
R2: Curvature radius of the image side surface;
D: Thickness of the center of the lens or the distance between the lenses;
nd: Refraction index of d line of lens material;
vd: Abbe number of lens material;
TL: Optical length (on-axis distance from the object side surface to the image side of the first lens);
BF: On-axis distance from the image side surface to the Gaussian image side of the first lens;
(Except for the thickness of glass flat panel GF)
Y: Maximum image height.

$$y=(x2/R)/[1+\{1-(k+1)(x2/R2)\}½]+A4x4+A6x6+A8x8+A10x10+A12x12+A14x14+A16x16 \qquad (14)$$

In which, R is the on-axis curvature radius, K is the conic coefficient, A4, A6, A8, A10, A12, A14, a16 are aspherical coefficients.

For convenience, the aspherical surface of each lens surface uses aspherical surface shown in Condition (14). However, the present invention is not limited to the aspheric polynomial expressed in Condition (14).

Embodiment 1

Figure 3:
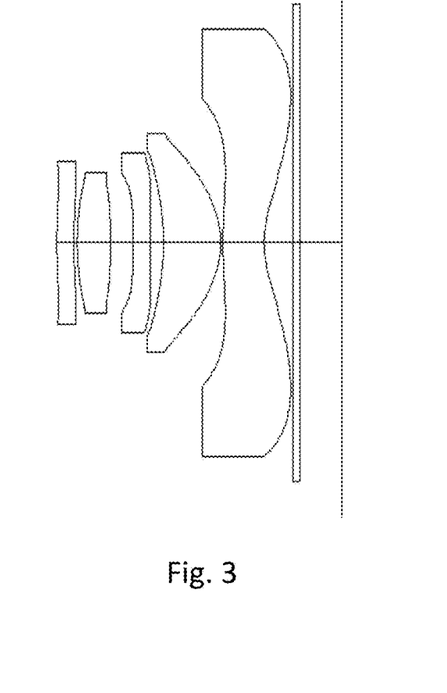
FIG. 3 is an illustrative structural view of a camera lens in accordance with a first embodiment of the present invention.

FIG. 3 is a configuration composition diagram of the camera lens LA in embodiment 1. The data in Table 1 are as follows: the curvature radius R1 of the object side surface of the first lens to the fifth lens which form camera lens LA in embodiment 1, the curvature radius R2 of the image side surface, the thickness of the center of the lens or the distance between lenses D, the refraction index nd, Abbe number VD. The data in Table 2 include: cone coefficient k and aspherical coefficients.

TABLE 1

|  |  | R | D | nd | Vd |
| --- | --- | --- | --- | --- | --- |
| First Lens | R1 | 3.730 | 0.210 | 1.6713 | 19.24 |
|  | R2 | 3.629 | 0.025 |  |  |
| Second Lens | R1 | 2.390 | 0.405 | 1.5441 | 56.12 |
|  | R2 | −7.199 | 0.397 |  |  |
| Third Lens | R1 | 17.684 | 0.225 | 1.6713 | 19.24 |
|  | R2 | 3.857 | 0.197 |  |  |
| Fourth Lens | R1 | −1.797 | 0.833 | 1.5352 | 56.12 |
|  | R2 | −0.680 | 0.03 |  |  |
| Fifth Lens | R1 | 2.500 | 0.588 | 1.5352 | 56.12 |
|  | R2 | 0.706 | 0.515 |  |  |
| Glass | R1 | ∞ | 0.11 | 1.5168 | 64.17 |
|  | R2 | ∞ |  |  |  |

TABLE 2

| | | Conic Index | Aspherical Index | | | | | | |
|---|---|---|---|---|---|---|---|---|---|
| | | k | A4 | A6 | A8 | A10 | A12 | A14 | A16 |
| First Lens | R1 | −15.6517 | −1.3728E−01 | −7.9973E−02 | 5.2618E−02 | −4.1572E−03 | 1.2740E−02 | 2.7974E−02 | −3.9529E−02 |
| | R2 | −26.3798 | −5.6905E−02 | −1.6099E−01 | 1.2026E−01 | 7.1551E−02 | −3.6296E−01 | 7.3420E−01 | −5.4760E−01 |
| Second Lens | R1 | 3.0648 | 7.6199E−02 | −9.7688E−02 | 1.5849E−01 | −3.1926E−01 | 5.2685E−02 | 3.7396E−01 | −7.5502E−01 |
| | R2 | 1.5961 | −9.4390E−02 | 1.6351E−01 | −4.6352E−01 | 3.8109E−01 | 3.9947E−01 | −1.5976E+00 | 6.4053E−01 |
| Third Lens | R1 | 0.0000 | −4.9866E−01 | −2.7251E−01 | 2.1743E−01 | −2.8037E−01 | −8.3825E−01 | 4.6155E−01 | 1.1627E+00 |
| | R2 | −38.8592 | −2.2946E−01 | −5.6945E−02 | 1.1629E−02 | 9.9273E−03 | −5.1724E−02 | 1.0674E−02 | 3.2005E−02 |
| Fourth Lens | R1 | −7.3348 | −3.8820E−02 | 6.1890E−02 | −2.3068E−01 | −2.8816E−02 | 1.1773E−01 | 5.9697E−02 | −7.7356E−02 |
| | R2 | −2.7480 | −2.4027E−01 | 8.4249E−02 | −4.0139E−02 | −1.3442E−02 | −6.6004E−04 | 6.9213E−03 | 6.3226E−03 |
| Fifth Lens | R1 | −0.2988 | −1.4448E−01 | 2.0968E−02 | 2.9436E−03 | −1.2480E−03 | −1.6605E−04 | 7.6186E−05 | −3.4427E−06 |
| | R2 | −4.7010 | −5.9619E−02 | 1.6210E−02 | −3.4574E−03 | 4.4353E−04 | −2.3429E−05 | −1.2071E−06 | 9.5303E−08 |

Table 11 shows the various values in embodiments 1, 2, 3, 4, 5 and the values corresponding to the parameters specified in the Conditions (1)-(13). The design reference wavelength of embodiments 1, 2, 3, 4, 5 is 555 nm.

As shown in Table 11, embodiment 1 satisfies the Conditions (1)-(13).

Figure 4:
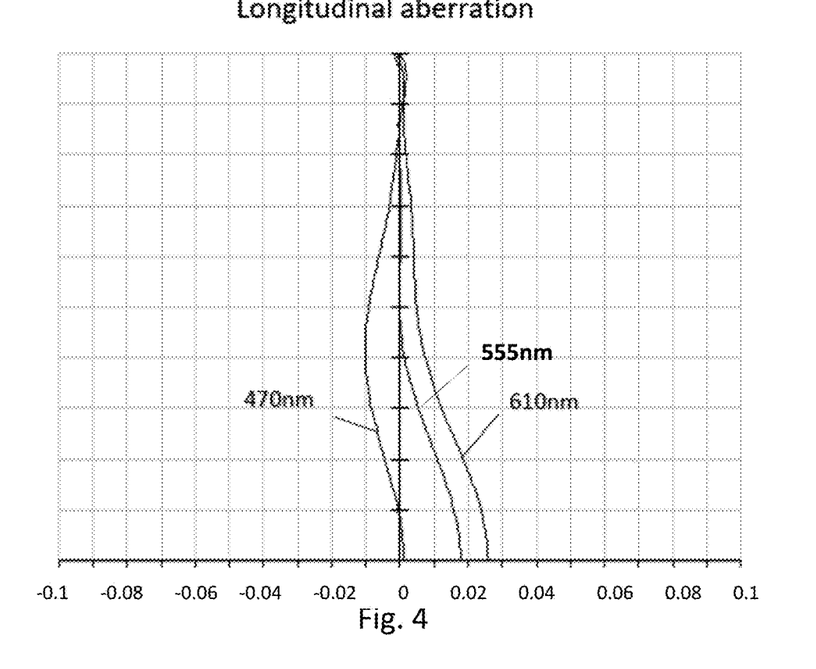
FIG. 4 presents the longitudinal aberration of the camera lens of the first embodiment.
Figure 5:
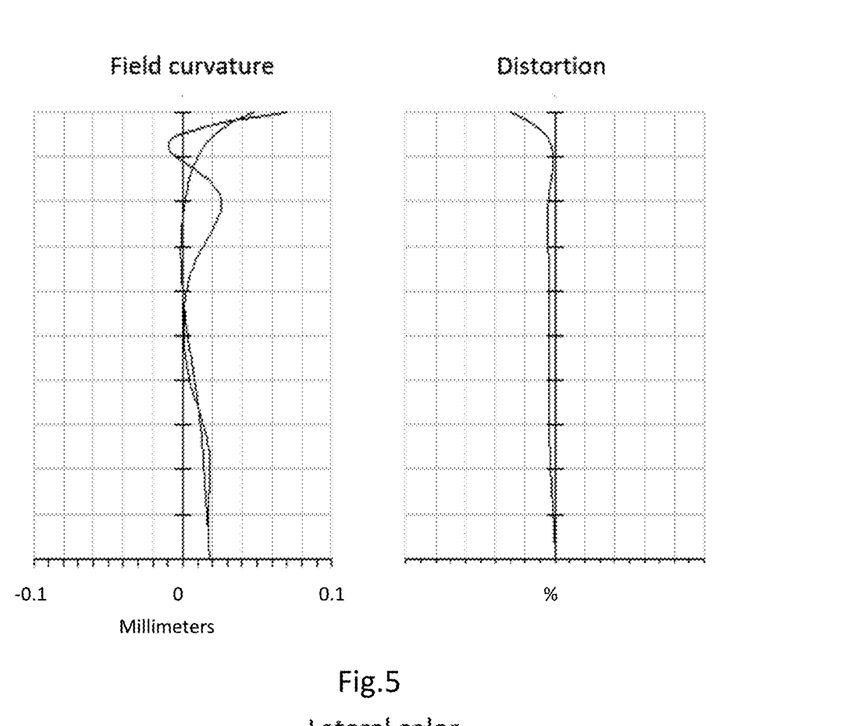
FIG. 5 presents the filed curvature and the distortion of the camera lens of the first embodiment.
Figure 6:
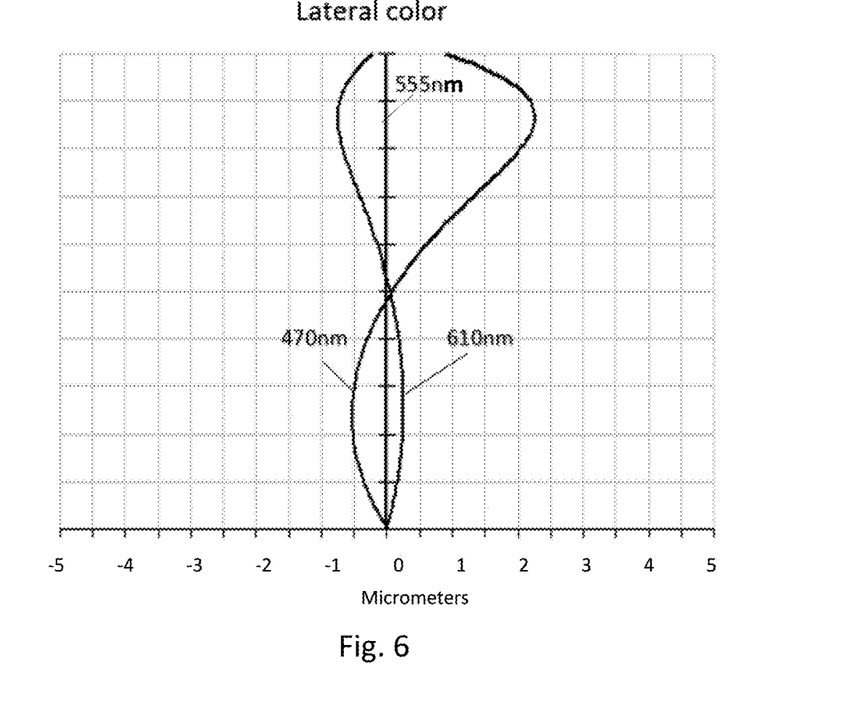
FIG. 6 presents the lateral color of the camera lens of the first embodiment.

In embodiment 1, the longitudinal aberration of the camera lens LA is shown in FIG. 4, the field curvature and distortion are shown in FIG. 5, and the lateral color is shown in FIG. 6. In addition, the field curvature S in FIG. 5 is the field curvature opposite the sagittal image surface and T is the field curvature opposite the tangent image surface, and the same is also true in embodiments 2, 3, 4 and 5.

TABLE 3

| | | R | D | nd | Vd |
|---|---|---|---|---|---|
| First Lens | R1 | 4.707 | 0.250 | 1.6713 | 19.24 |
| | R2 | 4.425 | 0.050 | | |
| Second Lens | R1 | 2.311 | 0.486 | 1.5441 | 56.12 |
| | R2 | −5.584 | 0.329 | | |
| Third Lens | R1 | 476.005 | 0.252 | 1.6713 | 19.24 |
| | R2 | 5.540 | 0.197 | | |
| Fourth Lens | R1 | −1.902 | 0.843 | 1.5352 | 56.12 |
| | R2 | −0.654 | 0.030 | | |
| Fifth Lens | R1 | 4.015 | 0.600 | 1.5352 | 56.12 |
| | R2 | 0.707 | 0.429 | | |
| Glass | R1 | ∞ | 0.110 | 1.5168 | 64.17 |
| | R2 | ∞ | | | |

TABLE 4

| | | Conic Index | Aspherical Index | | | | | | |
|---|---|---|---|---|---|---|---|---|---|
| | | k | A4 | A6 | A8 | A10 | A12 | A14 | A16 |
| First Lens | R1 | −12.5160 | −8.9709E−02 | −5.5789E−02 | 5.2961E−02 | −1.4015E−02 | −3.8027E−03 | 9.8648E−03 | −5.2438E−03 |
| | R2 | −26.3299 | −4.5898E−02 | −1.2392E−01 | 1.7928E−01 | 8.7393E−02 | −5.0904E−01 | 5.9041E−01 | −2.0779E−01 |
| Second Lens | R1 | 1.3700 | 1.4954E−02 | −7.4864E−02 | 5.7468E−02 | −1.2479E−01 | 2.9131E−01 | −1.1057E+00 | 9.2673E−01 |
| | R2 | −1.8465 | −1.1811E−01 | −6.3017E−05 | −1.3954E−01 | 8.3991E−03 | 1.3141E−01 | −4.6453E−01 | 2.1771E−01 |
| Third Lens | R1 | 0.0000 | −4.1343E−01 | −1.2630E−01 | −3.0602E−01 | 2.3387E−01 | 5.6351E−02 | 2.8528E−01 | −8.2863E−02 |
| | R2 | 11.7508 | −2.0861E−01 | −2.0760E−02 | 9.0289E−03 | 2.3166E−02 | 1.2388E−02 | −6.3801E−03 | −2.1519E−02 |
| Fourth Lens | R1 | −3.9886 | 5.6230E−03 | 8.4874E−02 | −1.5537E−01 | 1.2717E−02 | 5.7731E−02 | 2.5712E−02 | −4.8015E−02 |
| | R2 | −2.8336 | −2.3960E−01 | 9.6308E−02 | −3.2047E−02 | −7.5200E−03 | 7.4370E−04 | 4.9998E−03 | 4.2720E−03 |
| Fifth Lens | R1 | 5.0241 | −1.3178E−01 | 6.1033E−03 | 1.9682E−03 | −7.8296E−04 | −3.1086E−04 | −5.1351E−05 | −8.7324E−06 |
| | R2 | −5.19E+00 | −6.24E−02 | 1.82E−02 | −4.17E−03 | 4.46E−04 | −1.87E−05 | −9.54E−07 | 2.12E−08 |

Table 12 shows the values of f, Fno, 2ω, BF, TL and Y in embodiment 1, and the same is also true in embodiments 2, 3, 4 and 5.

Embodiment 2

Figure 7:
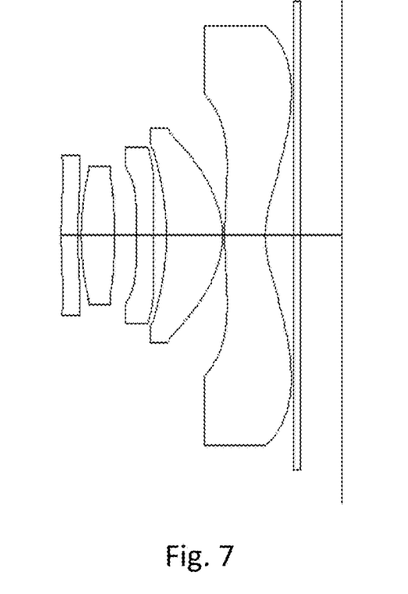
FIG. 7 is an illustrative structural view of a camera lens in accordance with a second embodiment of the present invention.

FIG. 7 is a configuration composition diagram of the camera lens LA in embodiment 2. The data in Table 3 are as follows: the curvature radius R1 of the object side surface of the first lens to the fifth lens which form camera lens LA in embodiment 2, the curvature radius R2 of the image side surface, the thickness of the center of the lens or the distance between lenses D, the refraction index nd, Abbe number VD. The data in Table 4 include: cone coefficient k and aspherical coefficients.

As shown in Table 11, embodiment 2 satisfies the Conditions (1)-(13).

Figure 8:
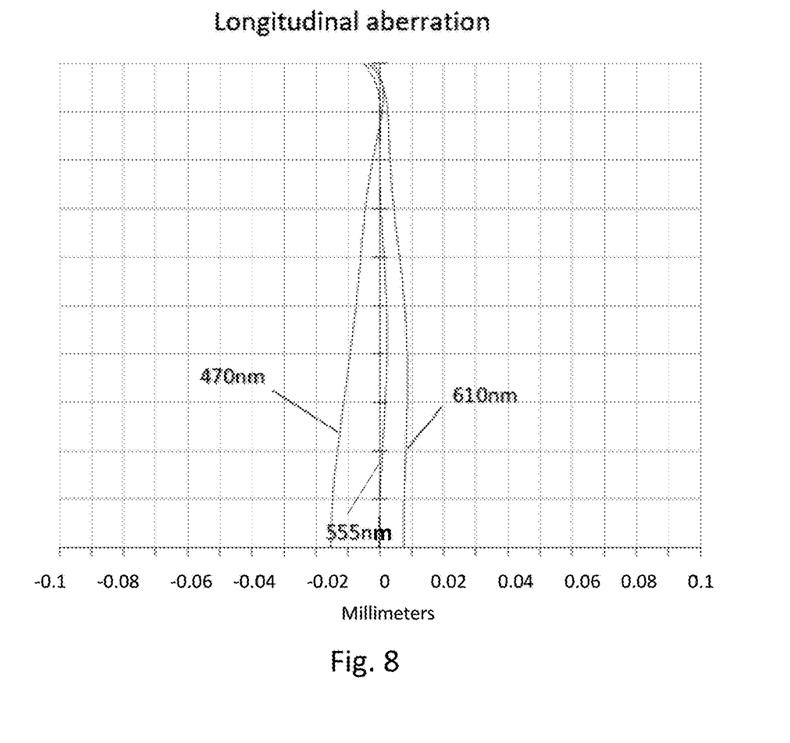
FIG. 8 presents the longitudinal aberration of the camera lens of the second embodiment.
Figure 9:
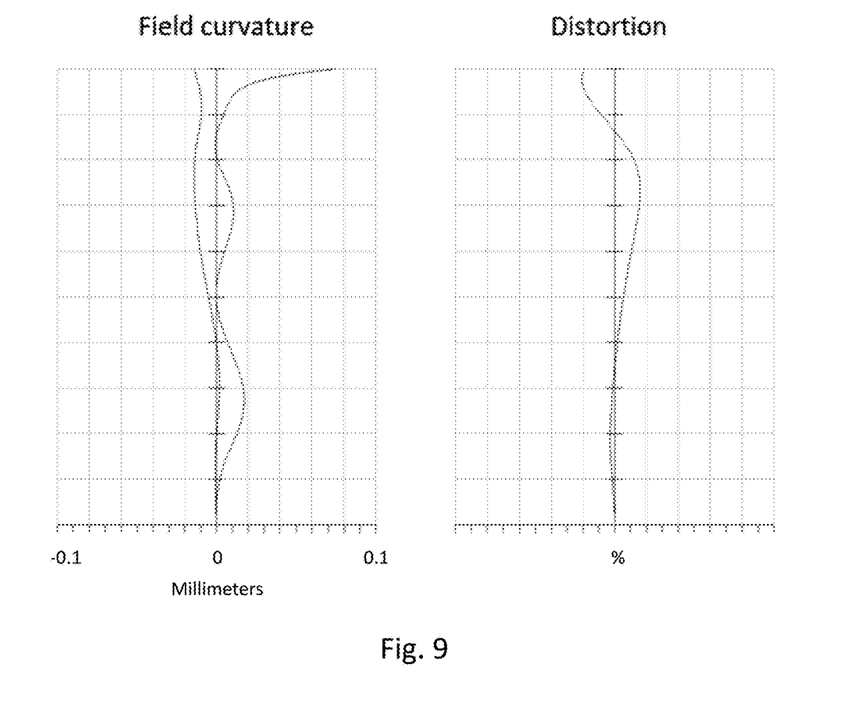
FIG. 9 presents the filed curvature and the distortion of the camera lens of the second embodiment.
Figure 10:
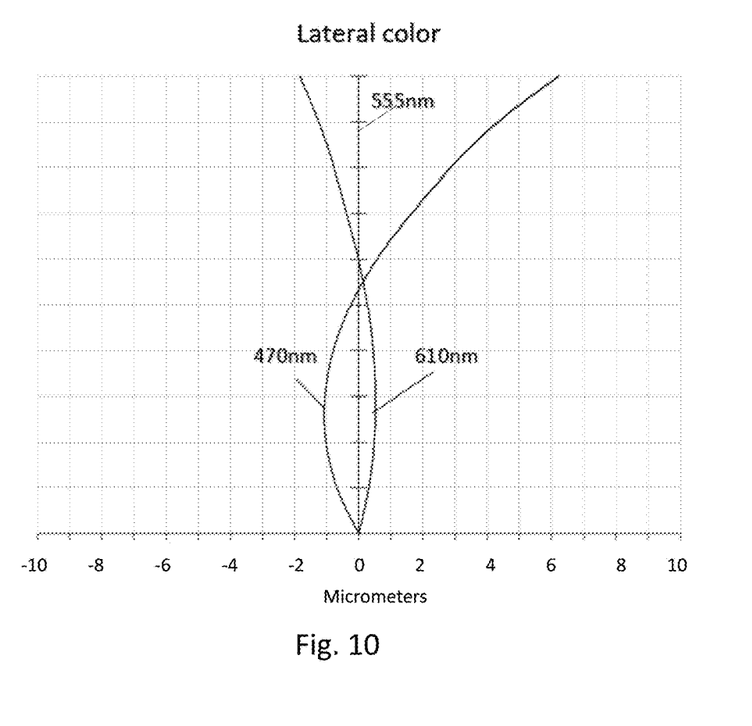
FIG. 10 presents the lateral color of the camera lens of the second embodiment.

In embodiment 2, the longitudinal aberration of the camera lens LA is shown in FIG. 8, the field curvature and distortion are shown in FIG. 8, and the lateral color is shown in FIG. 10.

Embodiment 3

Table 12 shows the values of f, Fno, 2ω, BF, TL and Y in embodiment 2.

Figure 11:
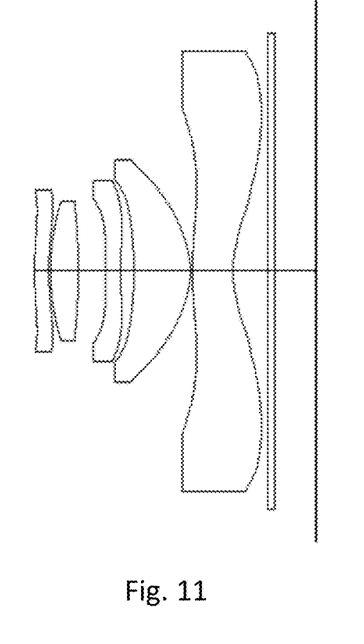
FIG. 11 is an illustrative structural view of a camera lens in accordance with a third embodiment of the present invention.

FIG. 11 is a configuration composition diagram of the camera lens LA in embodiment 3. The data in Table 5 are as follows: the curvature radius R1 of the object side surface of the first lens to the fifth lens which form camera lens LA in embodiment 3, the curvature radius R2 of the image side surface, the thickness of the center of the lens or the distance between lenses D, the refraction index nd, Abbe number VD. The data in Table 6 include: cone coefficient k and aspherical coefficients.

TABLE 5

|  |  | R | D | nd | Vd |
|---|---|---|---|---|---|
| First Lens | R1 | 3.029 | 0.210 | 1.6713 | 19.24 |
|  | R2 | 2.208 | 0.025 |  |  |
| Second Lens | R1 | 1.843 | 0.410 | 1.5441 | 56.12 |
|  | R2 | −6.727 | 0.407 |  |  |
| Third Lens | R1 | 14.882 | 0.222 | 1.6713 | 19.24 |
|  | R2 | 3.272 | 0.199 |  |  |
| Fourth Lens | R1 | −2.468 | 0.824 | 1.5352 | 56.12 |
|  | R2 | −0.701 | 0.030 |  |  |
| Fifth Lens | R1 | 2.867 | 0.595 | 1.5352 | 56.12 |
|  | R2 | 0.710 | 0.513 |  |  |
| Glass | R1 | ∞ | 0.110 | 1.5168 | 64.17 |
|  | R2 | ∞ |  |  |  |

TABLE 6

|  |  | Conic Index | Aspherical Index | | | | | | |
|---|---|---|---|---|---|---|---|---|---|
|  |  | k | A4 | A6 | A8 | A10 | A12 | A14 | A16 |
| First Lens | R1 | −8.3338 | −1.2530E−01 | −8.4553E−02 | 3.1328E−02 | −1.9934E−02 | 1.2630E−02 | 4.3331E−02 | −3.2310E−02 |
|  | R2 | −9.5595 | −6.5702E−02 | −2.1798E−01 | 1.1477E−01 | 9.3046E−02 | −3.8730E−01 | 6.7148E−01 | −3.9451E−01 |
| Second Lens | R1 | 0.4918 | 1.1158E−02 | −1.0969E−01 | 2.6533E−01 | −4.0004E−01 | −1.0030E−01 | 6.7379E−01 | −5.9454E−01 |
|  | R2 | −13.9714 | −8.8197E−02 | 1.8078E−01 | −4.0046E−01 | 4.0006E−01 | 3.3283E−01 | −1.6313E+00 | 1.0361E+00 |
| Third Lens | R1 | 0.0000 | −5.4275E−01 | −7.6991E−02 | 3.1818E−01 | −1.5991E−01 | −6.9233E−01 | 4.7959E−01 | 6.7330E−01 |
|  | R2 | −29.6965 | −2.5926E−01 | −1.9119E−01 | 3.0357E−01 | 1.5925E−01 | −4.8553E−01 | 1.4747E−01 | 3.8952E−02 |
| Fourth Lens | R1 | −15.0242 | 1.4666E−03 | −3.8087E−03 | −2.2881E−01 | −1.6691E−02 | 1.2369E−01 | 6.0550E−02 | −7.7881E−02 |
|  | R2 | −3.0153 | −2.1742E−01 | 1.0353E−01 | −3.8512E−02 | −1.6733E−02 | −3.5630E−03 | 4.6375E−03 | 5.0542E−03 |
| Fifth Lens | R1 | −0.5384 | −1.3913E−01 | 2.2329E−02 | 3.3415E−03 | −1.2085E−03 | −1.7003E−04 | 6.9808E−05 | −3.9228E−06 |
|  | R2 | −4.93E+00 | −5.93E−02 | 1.64E−02 | −3.50E−03 | 4.41E−04 | −2.33E−05 | −1.19E−06 | 9.60E−08 |

As shown in Table 11, embodiment 3 satisfies the Conditions (1)-(13).

Table 12 shows the values of f, Fno, 2ω, BF, TL and Y in embodiment 3.

Figure 12:
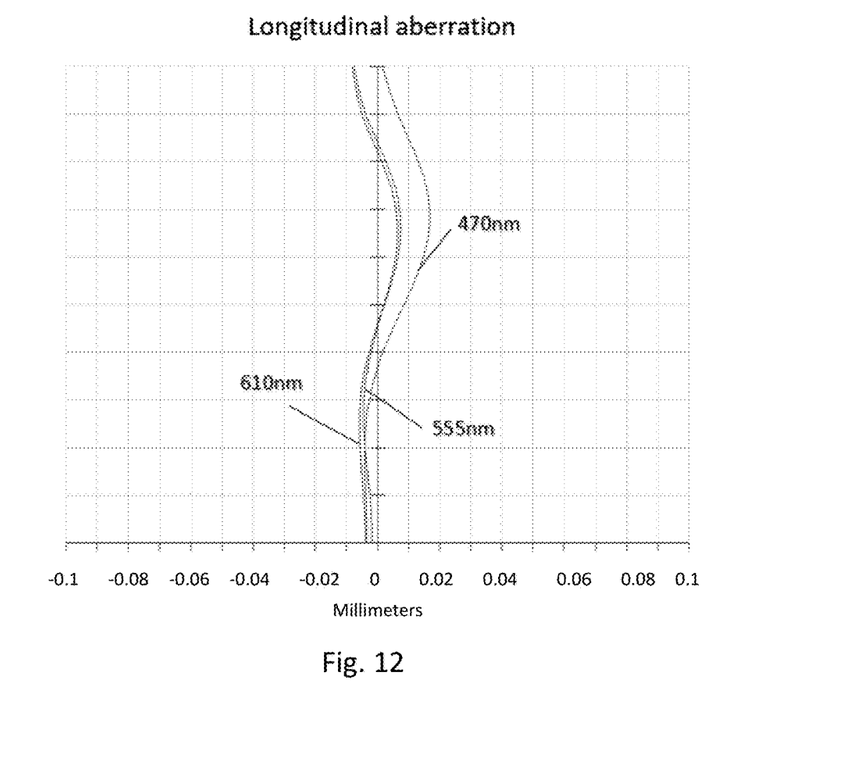
FIG. 12 presents the longitudinal aberration of the camera lens of the third embodiment.
Figure 13:
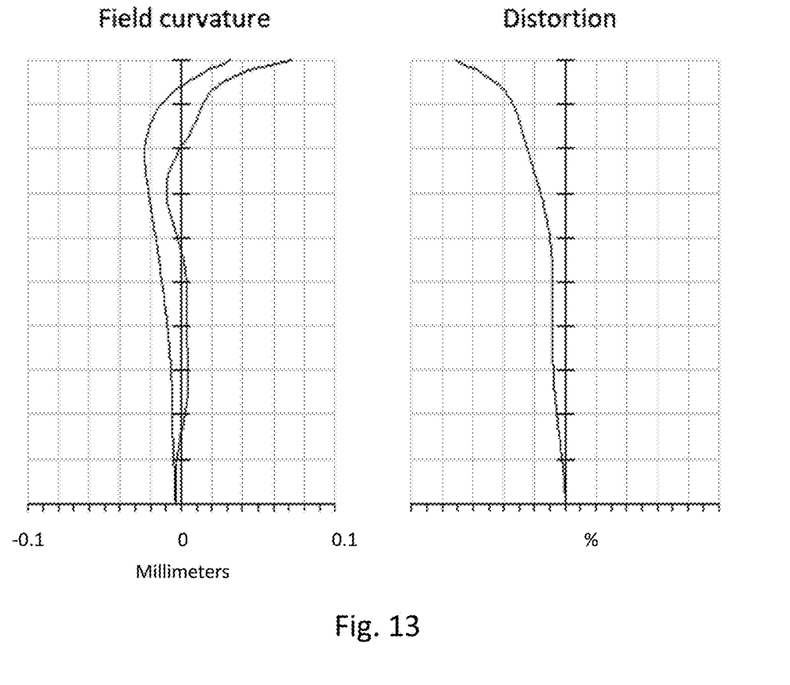
FIG. 13 presents the filed curvature and the distortion of the camera lens of the third embodiment.
Figure 14:
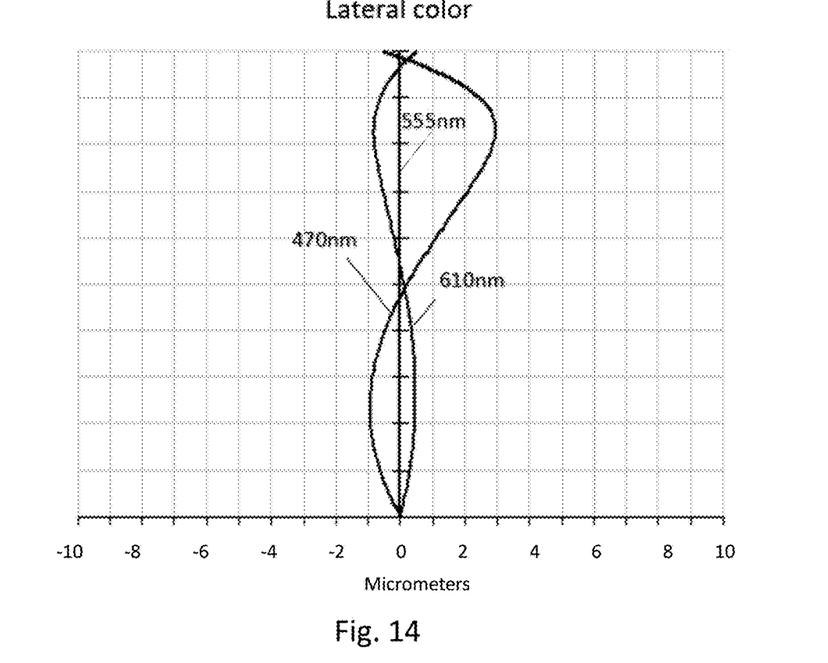
FIG. 14 presents the lateral color of the camera lens of the third embodiment.

In embodiment 3, the longitudinal aberration of the camera lens LA is shown in FIG. 12, the field curvature and distortion are shown in FIG. 13, and the lateral color is shown in FIG. 14.

Embodiment 4

Figure 15:
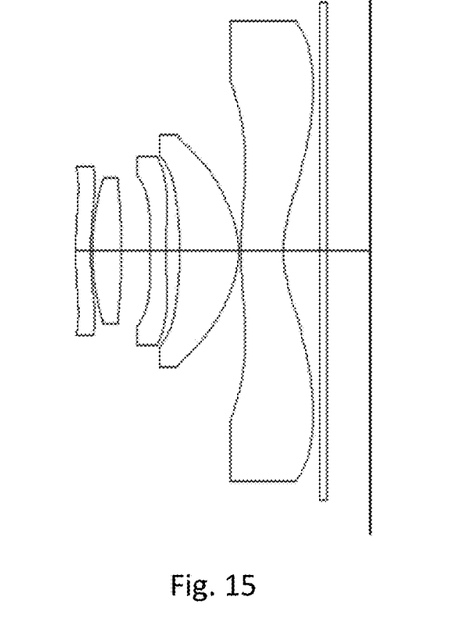
FIG. 15 is an illustrative structural view of a camera lens in accordance with a fourth embodiment of the present invention.

FIG. 15 is a configuration composition diagram of the camera lens LA in embodiment 4. The data in Table 7 are as follows: the curvature radius R1 of the object side surface of the first lens to the fifth lens which form camera lens LA in embodiment 4, the curvature radius R2 of the image side surface, the thickness of the center of the lens or the distance between lenses D, the refraction index nd, Abbe number VD. The data in Table 8 include: cone coefficient k and aspherical coefficients.

TABLE 7

|  |  | R | D | nd | Vd |
|---|---|---|---|---|---|
| First Lens | R1 | 3.076 | 0.200 | 1.6713 | 19.24 |
|  | R2 | 2.695 | 0.055 |  |  |
| Second Lens | R1 | 1.700 | 0.519 | 1.5441 | 56.12 |
|  | R2 | −15.147 | 0.321 |  |  |
| Third Lens | R1 | −7.668 | 0.246 | 1.6713 | 19.24 |
|  | R2 | 14.364 | 0.223 |  |  |

TABLE 7-continued

|  |  | R | D | nd | Vd |
|---|---|---|---|---|---|
| Fourth Lens | R1 | −2.046 | 0.686 | 1.5352 | 56.12 |
|  | R2 | −0.658 | 0.030 |  |  |
| Fifth Lens | R1 | 7.954 | 0.645 | 1.5352 | 56.12 |
|  | R2 | 0.785 | 0.406 |  |  |
| Glass | R1 | ∞ | 0.110 | 1.5168 | 64.17 |
|  | R2 | ∞ |  |  |  |

TABLE 8

|  |  | Conic Index | Aspherical Index | | | | | | |
|---|---|---|---|---|---|---|---|---|---|
|  |  | k | A4 | A6 | A8 | A10 | A12 | A14 | A16 |
| First Lens | R1 | −5.846 | −1.089E−01 | −9.967E−02 | 2.632E−02 | 6.037E−02 | 4.243E−02 | −9.523E−02 | 1.391E−02 |
|  | R2 | −11.664 | −6.021E−02 | −3.715E−01 | 5.419E−01 | −2.137E−02 | −1.042E+00 | 1.584E+00 | −8.937E−01 |
| Second Lens | R1 | −0.732 | 2.799E−02 | −6.487E−02 | −3.367E−02 | −1.353E−02 | 3.056E−01 | 1.671E−01 | −1.913E+00 |
|  | R2 | −3430.386 | −1.374E−01 | 1.701E−01 | −7.268E−01 | 6.068E−01 | 2.845E−01 | −2.258E+00 | 1.448E+00 |
| Third Lens | R1 | 79.331 | −4.241E−01 | −1.358E−01 | −1.261E−01 | −4.893E−01 | 9.435E−03 | 6.074E−01 | 1.168E+00 |
|  | R2 | 0.000 | −2.712E−01 | 6.583E−02 | −7.773E−02 | −9.881E−04 | 7.578E−02 | 3.356E−02 | −1.349E−02 |
| Fourth Lens | R1 | −0.158 | −5.379E−02 | 6.381E−02 | −1.371E−01 | 3.347E−02 | 6.704E−02 | −3.377E−02 | −1.616E−02 |
|  | R2 | −2.790 | −2.847E−01 | 1.411E−01 | −6.937E−02 | −2.176E−02 | 1.992E−02 | 2.176E−02 | −1.949E−03 |
| Fifth Lens | R1 | 17.070 | −9.602E−02 | 6.845E−03 | 4.175E−03 | −6.679E−04 | −9.347E−05 | 6.783E−05 | −1.451E−05 |
|  | R2 | −5.973 | −6.096E−02 | 1.850E−02 | −4.531E−03 | 5.294E−04 | −1.249E−05 | −1.571E−06 | −5.037E−08 |

As shown in Table 11, embodiment 4 satisfies the Conditions (1)-(13).

Table 12 shows the values of f, Fno, 2ω, BF, TL and Y in embodiment 4.

Figure 16:
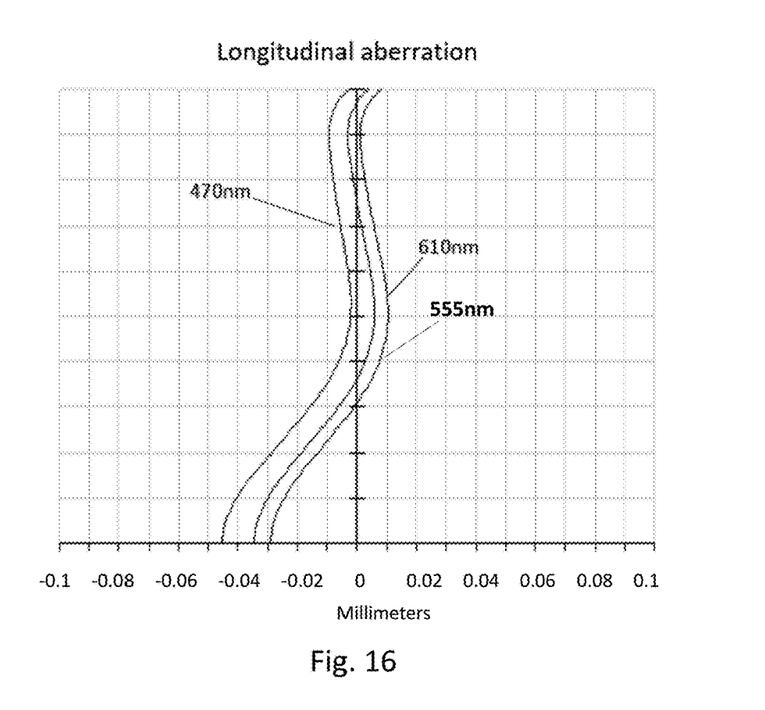
FIG. 16 presents the longitudinal aberration of the camera lens of the fourth embodiment.
Figure 17:
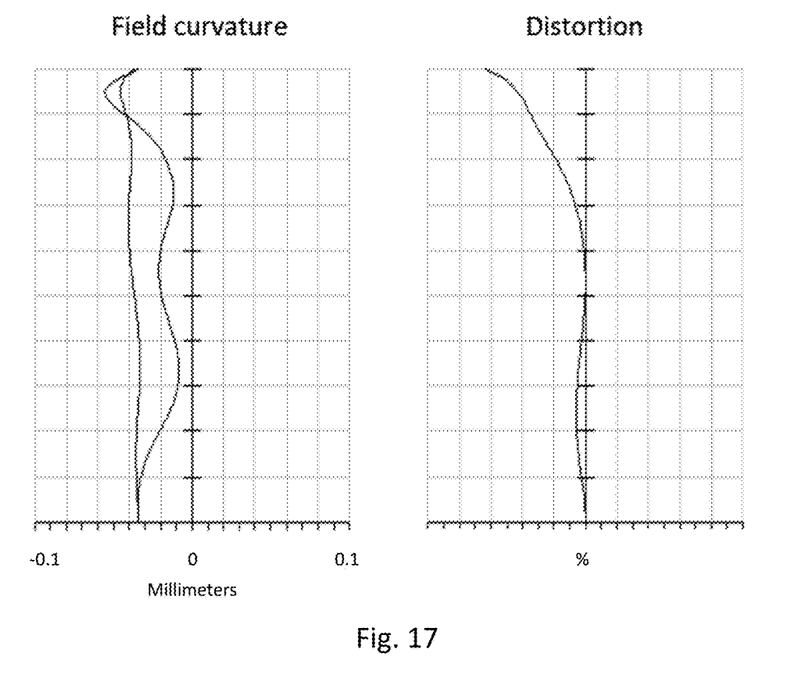
FIG. 17 presents the filed curvature and the distortion of the camera lens of the fourth embodiment.
Figure 18:
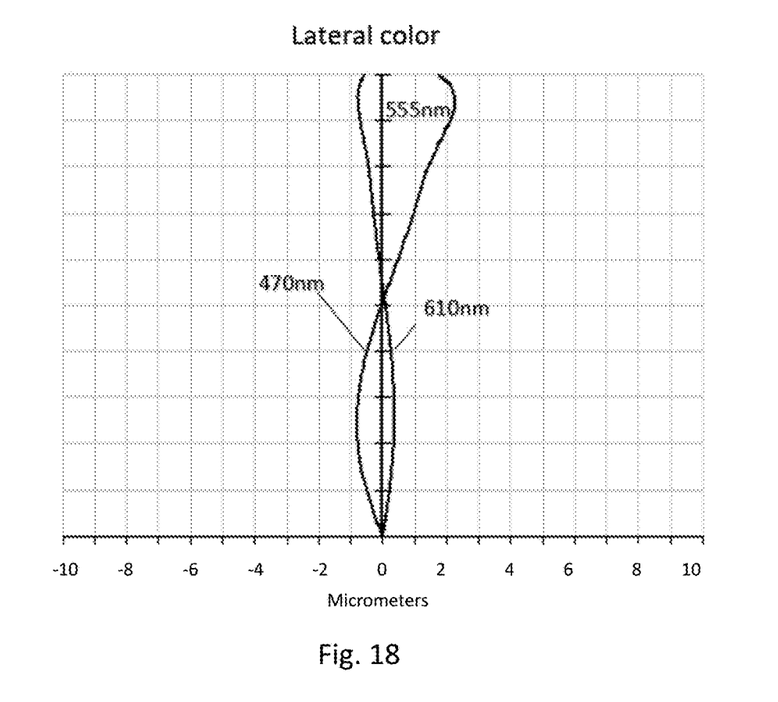
FIG. 18 presents the lateral color of the camera lens of the fourth embodiment.

In embodiment 4, the longitudinal aberration of the camera lens LA is shown in FIG. 16, the field curvature and distortion are shown in FIG. 17, and the lateral color is shown in FIG. 18.

Embodiment 5

Figure 19:
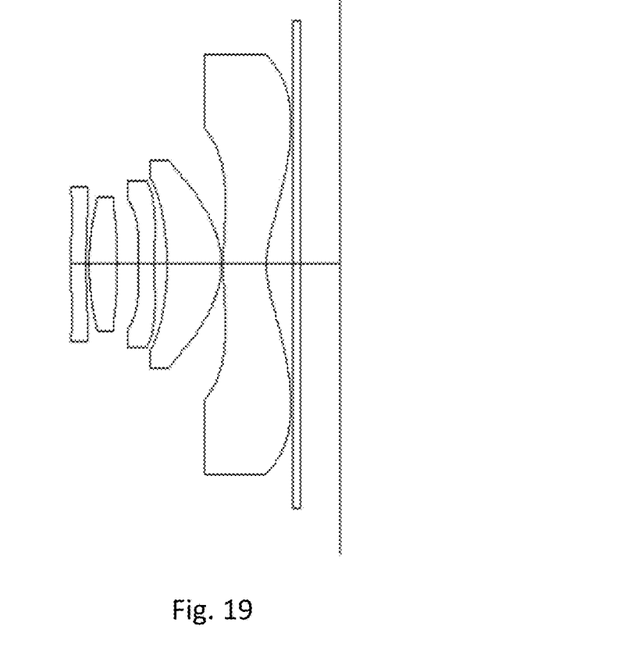
FIG. 19 is an illustrative structural view of a camera lens in accordance with a fifth embodiment of the present invention.

FIG. 19 is a configuration composition diagram of the camera lens LA in embodiment 5. The data in Table 9 are as follows: the curvature radius R1 of the object side surface of the first lens to the fifth lens which form camera lens LA in embodiment 5, the curvature radius R2 of the image side surface, the thickness of the center of the lens or the distance between lenses D, the refraction index nd, Abbe number VD. The data in Table 10 include: cone coefficient k and aspherical coefficients.

TABLE 9

|  |  | R | D | nd | Vd |
|---|---|---|---|---|---|
| First Lens | R1 | 4.854 | 0.238 | 1.6510 | 21.51 |
|  | R2 | 4.712 | 0.048 |  |  |
| Second Lens | R1 | 2.250 | 0.432 | 1.5441 | 56.12 |
|  | R2 | −6.227 | 0.332 |  |  |
| Third Lens | R1 | −33.034 | 0.250 | 1.6713 | 19.24 |
|  | R2 | 6.428 | 0.197 |  |  |
| Fourth Lens | R1 | −1.910 | 0.835 | 1.5352 | 56.12 |
|  | R2 | −0.696 | 0.030 |  |  |
| Fifth Lens | R1 | 4.006 | 0.665 | 1.5352 | 56.12 |
|  | R2 | 0.763 | 0.414 |  |  |
| Glass | R1 | ∞ | 0.110 | 1.5168 | 64.17 |
|  | R2 | ∞ |  |  |  |

TABLE 10

|  |  | Conic Index | Aspherical Index | | | | | | |
|---|---|---|---|---|---|---|---|---|---|
|  |  | k | A4 | A6 | A8 | A10 | A12 | A14 | A16 |
| First Lens | R1 | −25.341 | −1.013E−01 | −6.546E−02 | 5.423E−02 | −1.557E−02 | 4.134E−03 | 2.562E−02 | −2.003E−02 |
|  | R2 | −50.950 | −5.228E−02 | −1.366E−01 | 1.792E−01 | 1.016E−01 | −4.874E−01 | 5.933E−01 | −2.221E−01 |
| Second Lens | R1 | 1.629 | 1.626E−02 | −4.990E−02 | 6.190E−02 | −1.272E−01 | 2.807E−01 | −1.060E+00 | 7.850E−01 |
|  | R2 | −7.287 | −1.085E−01 | 7.735E−03 | −1.541E−01 | 1.712E−02 | 1.476E−01 | −4.672E−01 | 1.299E−01 |
| Third Lens | R1 | 0.000 | −4.445E−01 | −1.105E−01 | −3.072E−01 | 2.475E−01 | 1.053E−02 | 2.804E−01 | 4.773E−02 |
|  | R2 | −7.822 | −2.220E−01 | −2.489E−02 | −8.627E−03 | 1.560E−02 | 1.646E−02 | 8.059E−04 | −2.068E−02 |
| Fourth Lens | R1 | −9.272 | −3.965E−02 | 5.044E−02 | −1.644E−01 | 1.740E−02 | 5.931E−02 | 2.623E−02 | −5.285E−02 |
|  | R2 | −2.766 | −2.280E−01 | 9.135E−02 | −3.449E−02 | −6.850E−03 | 1.804E−03 | 5.606E−03 | 4.375E−03 |
| Fifth Lens | R1 | 4.879 | −1.463E−01 | 1.210E−02 | 2.796E−03 | −9.904E−04 | −3.920E−04 | −3.962E−05 | 1.303E−05 |
|  | R2 | −5.227 | −6.393E−02 | 1.874E−02 | −4.153E−03 | 4.522E−04 | −1.795E−05 | −9.084E−07 | 8.283E−09 |

As shown in Table 11, embodiment 5 satisfies the Conditions (1)-(13).

Table 12 shows the values of f, Fno, 2ω, BF, TL and Y in embodiment 5.

Figure 20:
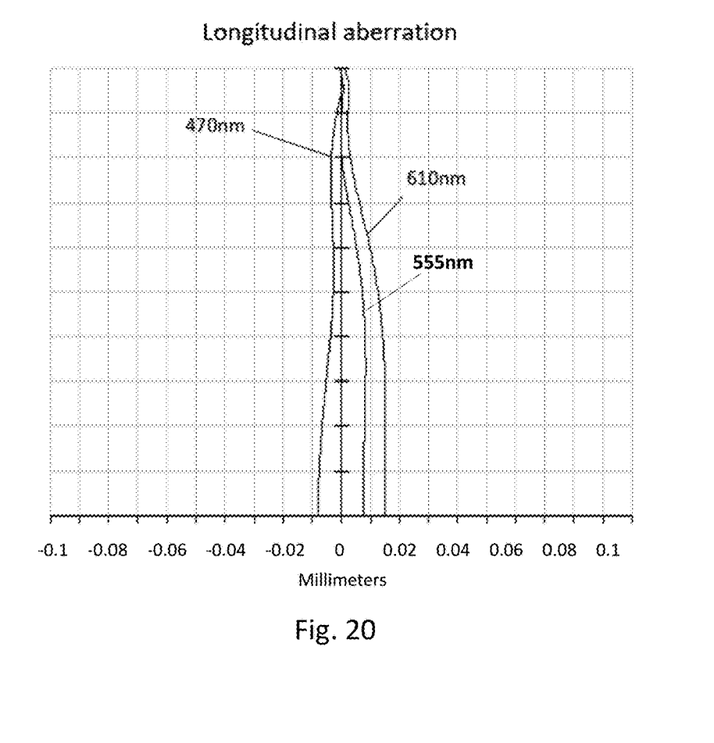
FIG. 20 presents the longitudinal aberration of the camera lens of the fifth embodiment.
Figure 21:
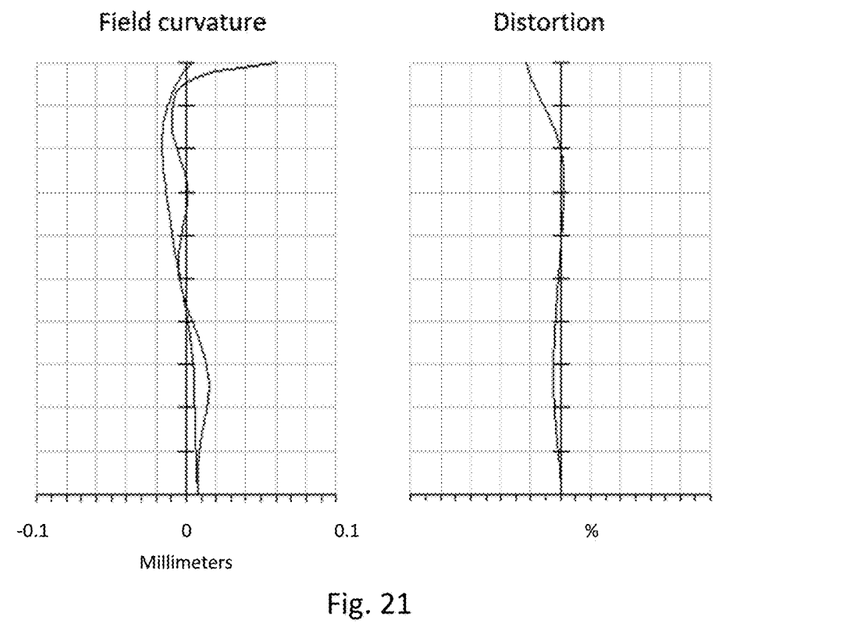
FIG. 21 presents the filed curvature and the distortion of the camera lens of the fifth embodiment.
Figure 22:
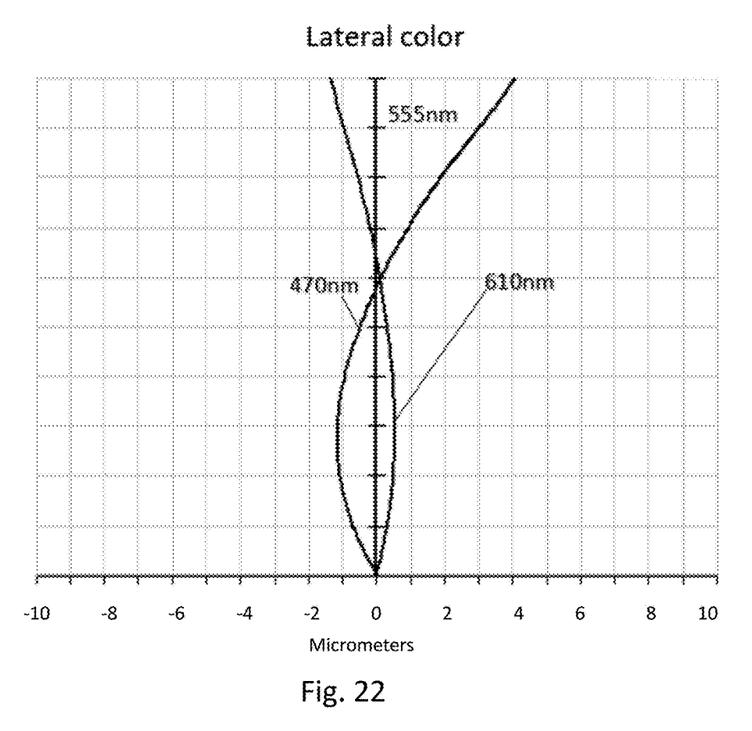
FIG. 22 presents the lateral color of the camera lens of the fifth embodiment.

In embodiment 5, the longitudinal aberration of the camera lens LA is shown in FIG. 20, the field curvature and distortion are shown in FIG. 21, and the lateral color is shown in FIG. 22.

TABLE 11

|  |  |  | Embodiment 1 | Embodiment 2 | Embodiment 3 | Embodiment 4 | Embodiment 5 |
|---|---|---|---|---|---|---|---|
| Condition | 1 | f1/f2 | −366.8 | −55.6 | −5.0 | −366.8 | −236.0 |
|  | 2 | T23/f | 0.15 | 0.12 | 0.15 | 0.12 | 0.12 |
|  | 3 & 9 | R31/f3 | −2.41 | −57.52 | −2.39 | 1.05 | 4.17 |
|  | 4 | R32/f3 | −0.53 | −0.67 | −0.52 | −1.96 | −0.81 |
|  | 5 | V1 | 19.24 | 19.24 | 19.24 | 19.24 | 21.51 |
|  | 6 | V3 | 56.12 | 56.12 | 56.12 | 56.12 | 56.12 |
|  | 7 | V2 > V3(V2) | 19.24 | 19.24 | 19.24 | 19.24 | 19.24 |
|  | 8 & 10 | V2 − V1 | 36.87 | 36.87 | 36.87 | 36.87 | 34.60 |
|  | 11 | |R32 − R41|/|R41| | 3.15 | 3.91 | 2.33 | 8.02 | 4.37 |
|  | 12 | |R42|/f4 | 0.42 | 0.44 | 0.45 | 0.41 | 0.42 |
|  | 13 | f2/f | 1.26 | 1.19 | 1.26 | 1.27 | 1.17 |

TABLE 12

|  | Embodiment 1 | Embodiment 2 | Embodiment 3 | Embodiment 4 | Embodiment 5 |
|---|---|---|---|---|---|
| f | 2.71 | 2.68 | 2.75 | 2.7 | 2.69 |
| Fno | 2.09 | 2.11 | 2.1 | 2.12 | 2.1 |
| 2ω | 87.89 | 95.03 | 94.87 | 95.04 | 94.31 |
| BF | 1.215 | 1.111 | 1.192 | 1.054 | 1.104 |
| TL | 4.145 | 4.186 | 4.155 | 4.051 | 4.167 |
| Y | 5.794 | 5.794 | 5.794 | 5.794 | 5.794 | f: The focal length of the whole camera lens;
Fno: F value;
2ω: Field of view angle;
R: Curvature radius of the optical surface, central curvature radius in case of lens.
R1: Curvature radius of the object side;
R2: Curvature radius of the image side surface;
D: Thickness of the center of the lens or the distance between the lenses;
nd: Refraction index of d line of lens material;
vd: Abbe number of lens material;
TL: Optical length (on-axis distance from the object side to the image side of the first lens);
BF: On-axis distance from the image side surface to the Gaussian image side of the first lens;
(Except for the thickness of glass flat panel GF)
Y: Maximum image height.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera lens comprising, in an order from an object side to an image side: a first lens having a negative refractive power with a convex object side surface, a second lens having a positive refractive power with a convex object side surface, a third lens having negative refractive power with a concave image side surface, a fourth lens having a positive refractive power with a concave object side surface, and a fifth lens having a negative refractive power with a convex object side surface and a concave image side surface, wherein the object side surface of the first lens, an object side surface and the image side surface of the third lens, the object side surface and an image side surface of the fourth lens, the object side surface and the image side surface of the fifth lens are aspherical surfaces, and the camera lens further satisfies the following conditions (1)~(4) and (13-1):

$$-550 \leq f1/f2 \leq -2.5 \qquad (1)$$

$$0.1 \leq T23/f \leq 0.2 \qquad (2)$$

$$-86.3 \leq R31/f3 \leq 6.3 \qquad (3)$$

$$-2.0 \leq R32/f3 \leq -0.3 \qquad (4)$$

$$0.6 < f12/f \leq 1.27 \qquad (13\text{-}1)$$

where
f1: the focal length of the first lens;
f2: the focal length of the second lens;
f3: the focal length of the third lens;
f: the focal length of the whole camera lens;
T23: the air interval on an optical axis between the second lens and the third lens;
R31: Curvature of the object side of the third lens;
R32: Curvature of the image side surface of the third lens;
f12: the synthetic focal length of the first lens and the second.

2. The camera lens as described in claim 1 further satisfying the following Conditions (5)-(8):

$$15 \leq V1 \leq 23.7 \qquad (5)$$

$$15 \leq V3 \leq 23.1 \qquad (6)$$

$$V2 > V3 \qquad (7)$$

$$34.5 \leq V2 - V1 \leq 55.3 \qquad (8)$$

where,
V1: the Abbe number of the first lens;
V2: the Abbe number of the second lens;
V3: the Abbe number of the third lens.

3. The camera lens as described in claim 1, wherein the object side surface of the third lens has a convex surface near the axis toward the object side, the part near the optical axis faces the outside, from the object side, the surface is formed from convex to concave, and satisfies the following Conditions (9)-(10):

$$-86.3 \leq R31/f3 \leq 0.0 \qquad (9)$$

$$35.5 \leq V2 - V1 \leq 44.2 \qquad (10)$$

where,
R31: the curvature of the object side of the third lens;
f3: the focal length of the third lens.

4. The camera lens as described in claim 3, wherein the image side surface of the third lens, from the image side, presents a change from concave to convex.

5. The camera lens as described in claim 1 further satisfying the following Condition (11):

$$2.0 < |R32 - R41|/|R41| < 12.0 \qquad (11)$$

where,
R32: the curvature of the image side surface of the third lens;
R41: the curvature of the object side surface of the fourth lens.

6. The camera lens as described in claim 1, wherein the image side surface of the fourth lens, from the image side, presents a change from convex to concave, and the camera lens further satisfies the following Condition (12):

$$0.35 < |R42|/f4 < 0.48 \qquad (12)$$

where,
R42: the curvature of the image side surface of the fourth lens;
f4: the focal length of the fourth lens.

7. The camera lens as described in claim 1, wherein the object side surface of the first lens, from the object side, presents a change from convex to concave.

* * * * *